(12) United States Patent
Britt

(10) Patent No.: US 8,046,447 B2
(45) Date of Patent: Oct. 25, 2011

(54) MECHANISM FOR SPECIFYING PORT-RELATED DATA FROM NETWORK DEVICES

(75) Inventor: Steven V. Britt, Roseville, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1281 days.

(21) Appl. No.: 11/477,864

(22) Filed: Jun. 30, 2006

(65) Prior Publication Data

US 2008/0005267 A1    Jan. 3, 2008

(51) Int. Cl.
*G06F 15/16* (2006.01)
(52) U.S. Cl. ................. 709/223; 709/220
(58) Field of Classification Search ............ 709/224, 709/223, 220
See application file for complete search history.

(56) References Cited

U.S. PATENT DOCUMENTS

| | | | |
|---|---|---|---|
| 5,504,892 A * | 4/1996 | Atsatt et al. | 707/103 R |
| 5,649,192 A * | 7/1997 | Stucky | 707/103 R |
| 5,778,378 A * | 7/1998 | Rubin | 707/103 R |
| 6,016,495 A * | 1/2000 | McKeehan et al. | 707/103 R |
| 6,061,515 A * | 5/2000 | Chang et al. | 717/114 |
| 6,122,639 A * | 9/2000 | Babu et al. | 707/999.103 |
| 6,226,788 B1 * | 5/2001 | Schoening et al. | 717/107 |
| 6,263,370 B1 * | 7/2001 | Kirchner et al. | 709/230 |
| 6,272,537 B1 * | 8/2001 | Kekic et al. | 709/223 |
| 6,769,124 B1 * | 7/2004 | Schoening et al. | 719/316 |
| 2002/0178380 A1 * | 11/2002 | Wolf et al. | 713/201 |
| 2003/0088593 A1 * | 5/2003 | Stickler | 707/205 |
| 2003/0193994 A1 * | 10/2003 | Stickler | 375/150 |
| 2003/0200285 A1 * | 10/2003 | Hansen et al. | 709/220 |
| 2004/0088361 A1 * | 5/2004 | Statman | 709/206 |
| 2004/0207863 A1 * | 10/2004 | Christiansen | 358/1.13 |
| 2005/0289510 A1 * | 12/2005 | Illowsky et al. | 717/107 |
| 2007/0097972 A1 * | 5/2007 | Jain et al. | 370/392 |
| 2007/0223470 A1 * | 9/2007 | Stahl | 370/389 |

* cited by examiner

*Primary Examiner* — Patrice Winder

(57) ABSTRACT

A computer system for and method of requesting networked device information is described. The computer system comprises a processor and a data store. The data store comprises one or more data identifier groups hierarchically specifying data available from one or more networked devices and a data retrieval tool comprising a set of instructions executable by the processor to obtain data from a network device. The data retrieval tool is arranged to request the data from the network device based on a data identifier group.

14 Claims, 7 Drawing Sheets

MECHANISM FOR SPECIFYING PORT-RELATED DATA FROM NETWORK DEVICES

BACKGROUND

Numerous networking mediums may be used to connect two or more devices to each other. Each networking medium-type has specific operating characteristics to the particular medium type and medium-specific facets of configuration, behavior, performance, and monitoring.

Different software applications, i.e., sequences of executable instructions, exist for providing the capability to retrieve from network interconnect devices (NID) dat that describes the NID configuration, including port-specific details, via various protocols, i.e., simple network management protocol (SNMP). Such software applications may be referred to as data retrieval tools. Retrieval of NID configuration information is typically performed on an infrequent basis, e.g., to discover and/or update a network topology database. Due to the infrequent nature of NID configuration information retrieval, the efficiency with which software applications retrieve the configuration information is not a high priority.

The configuration information retrieved from a NID during data retrieval operations by a data retrieval tool is specified by a standard, e.g., a ratified standard or a de facto standard, to provide compatibility between NIDs from different manufacturers. Each individual NID typically includes more than one, and oftentimes many, ports. Because of the plurality of NID ports, data retrieval tool efficiency at using data retrieved from NIDs is important in order to monitor the state and performance of such NIDs. The relatively large volume of data retrieved, e.g., retrieval of the same set of counter data from each device port, and the relative frequency at which the data and information based thereon is requested increases the importance of data retrieval tool efficiency.

Data retrieval tools attempt to minimize memory and computer resources, e.g., processor cycles, consumed on the host processing system in order to minimize impacts on the host system, e.g., rendering the host system unusable or unusable for any purpose other than executing the data retrieval tool. Further, data retrieval tools are designed to attempt to minimize additional overhead introduced on the network and on individual NIDs which are in communication with the data retrieval tool.

DESCRIPTION OF THE DRAWINGS

The present invention is illustrated by way of example, and not by limitation, in the figures of the accompanying drawings, wherein elements having the same reference numeral designations represent like elements throughout and wherein.

DETAILED DESCRIPTION

Figure 1:
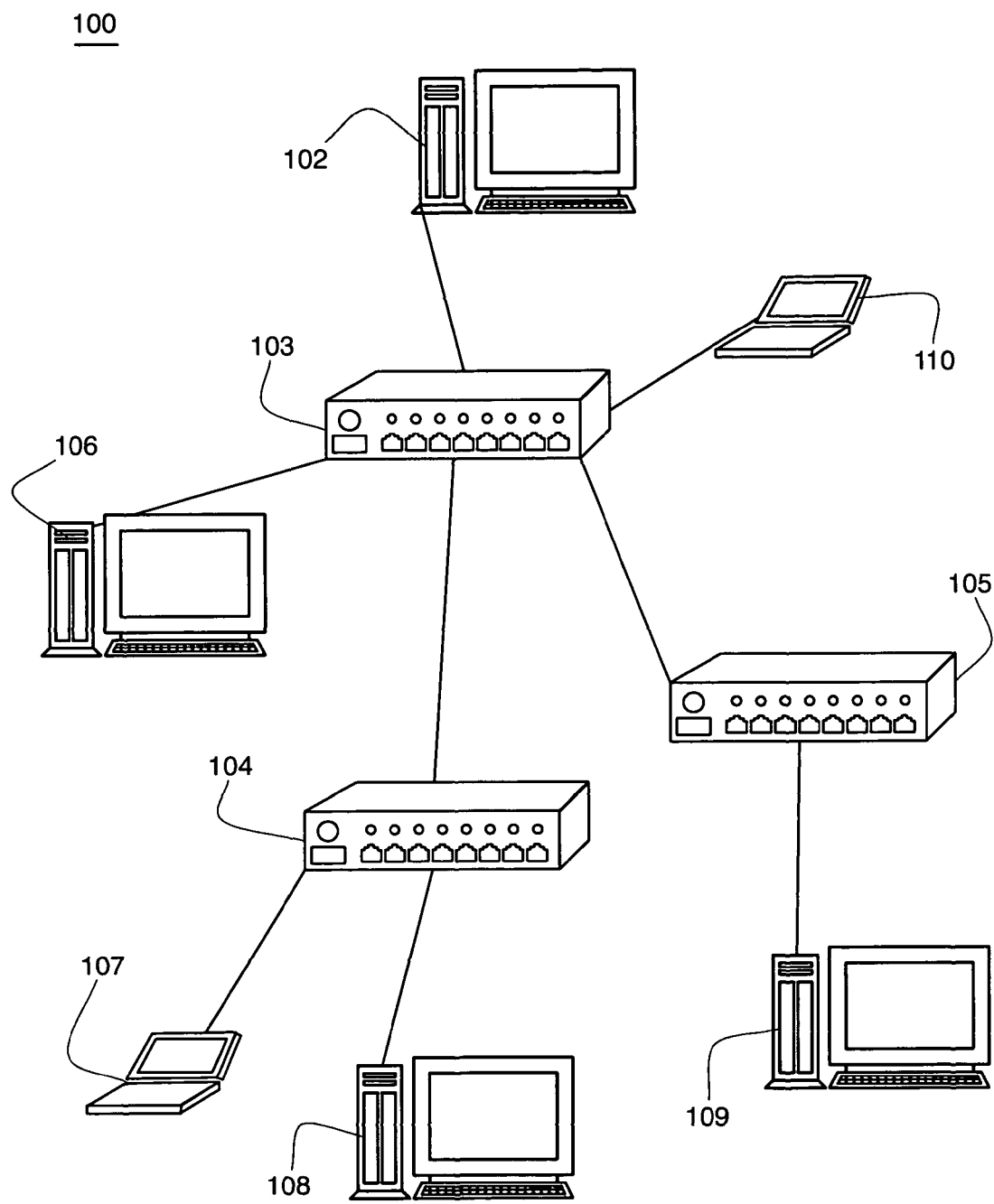
FIG. 1 is a high level block diagram of a network usable with an embodiment.

FIG. 1 depicts a network 100 of interconnected devices comprising a computer system 102 and three interconnected NIDs 103, 104, 105 which provide network connectivity between network connected computer systems 102, and 106-110. In at least some embodiments, one or more NIDs may provide wireless network connections to computer systems 102, and 106-110 and/or other NIDs.

In at least one embodiment, NIDs 103, 104, and 105 may be a network-connected device able to be communicated with using a network management protocol, e.g., simple network management protocol (SNMP), in order to configure the device as well as obtain operating information about the device, e.g., in-bound packets handled, out-bound packets handled, in-bound bytes, out-bound bytes, etc.

Figure 2:
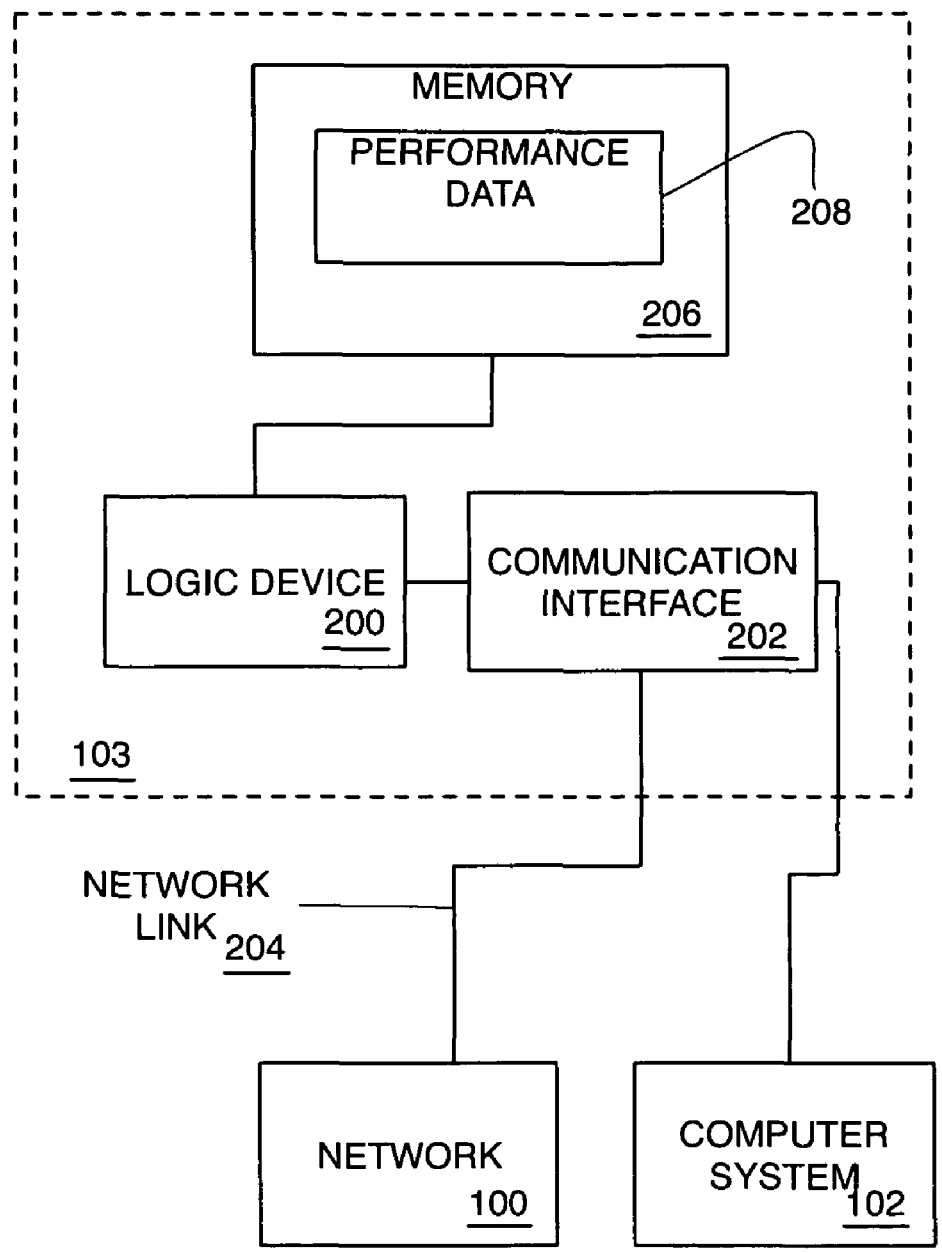
FIG. 2 is a high-level block diagram of a network device usable with an embodiment.

FIG. 2 depicts a high-level block diagram of NID 103. NID 103 comprises a logic device 200, e.g., a processor, a programmable or non-programmable logic device, etc., which collects data regarding performance of the particular host NID, as well as, executes a set of instructions for controlling operation of the NID. In at least some embodiments, logic device 200 stores collected performance data 208 in a storage device, e.g., memory 206, internal to the NID. In at least one embodiment, performance data 208 is stored in a management information base (MIB) stored in memory 206.

NID 103 also comprises a communication interface 202 communicatively coupled with logic device 200. Communication interface 202 comprises one or more ports for transmitting and receiving communication signals to/from other devices connected with NID 103. In at least one embodiment, NID 103 comprises at least one port. In at least some embodiments, NID 103 comprises a plurality of ports. As depicted in FIG. 2, communication interface 202 connects NID 103 with computer system 102 and the remainder of network 100. Communication interface 202 is used for one-way and/or two-way network communication. Communication interface 202 sends and receives electrical, electromagnetic or optical signals which carry digital data streams representing various types of information. Communication interface 202 may be an integrated services digital network (ISDN) card, a digital subscriber line (DSL) card, a modem to provide a data communication connection to a corresponding type of telephone line, or as another example, communication interface 202 may be a local area network (LAN) card to provide a data communication connection to a compatible LAN. Communication interface 202 may also implement wireless links.

Memory 206 may be a random access memory (RAM), read-only memory (ROM), a programmable ROM (PROM), an electrically programmable ROM (EPROM), a FLASH-EPROM, or other memory from which logic device 200 may be configured to read and execute instructions and write performance data 208. Memory 206 is a computer-readable medium and may comprise a floppy disk, a flexible disk, hard disk, magnetic tape, or any other magnetic medium, a compact disc-read only memory (CD-ROM), any other optical medium, punch cards, paper tape, any other physical medium with patterns of holes, a random access memory (RAM), a programmable read only memory (PROM), an electrically programmable ROM (EPROM), a FLASH-EPROM, any other memory chip or cartridge, a carrier wave embodied in an electrical, electromagnetic, infrared, or optical signal, or any other medium from which logic device 200 can read.

Figure 3:
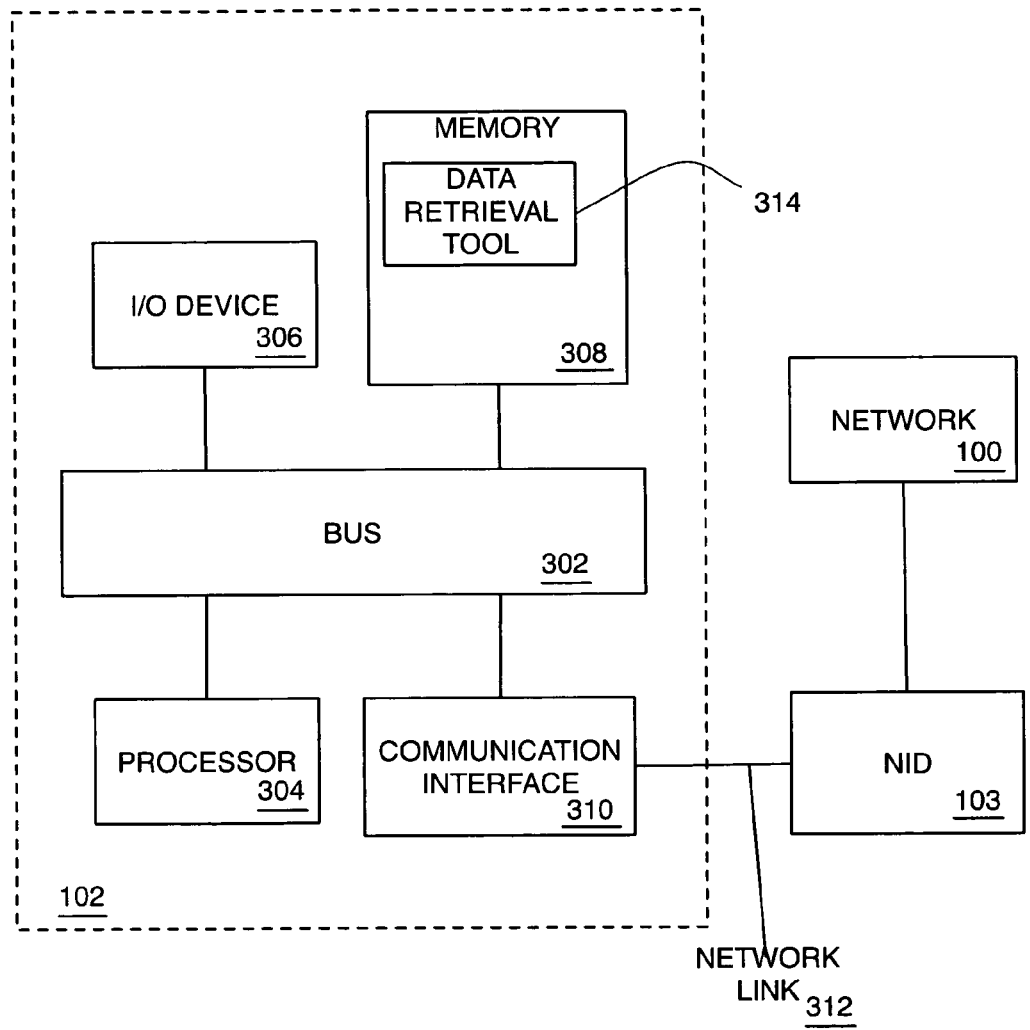
FIG. 3 is a high-level functional block diagram of a computer system usable with an embodiment.

FIG. 3 depicts a high-level functional block diagram of computer system 102 within which embodiments of the present invention are used to advantage. Computer system 102 comprises a bus 302 or other communication mechanism, and a processor 304 coupled with the bus. Computer system 102 also comprises a memory 308, such as a random access memory (RAM) or other volatile storage device, coupled to bus 302 for storing data and instructions to be executed by processor 304. Memory 308 also may be used for storing temporary variables or other intermediate information during execution of instructions to be executed by processor 304. In at least some embodiments, computer system 102 further comprises a read only memory (ROM) or other static storage device coupled to bus 302 for storing static information and instructions for processor 304.

Memory 308 is a memory as described above with respect to memory 206. Memory 308 comprises a data retrieval tool 314, i.e., a set of executable instructions for execution by processor 304. Computer system 102 is depicted as having a single data memory 308; however, in other embodiments there may be more than one memory.

Computer system 102 is communicatively coupled via bus 302 to an input/output device 306 (I/O device), for example a touch-screen display, for displaying information to a user and receiving commands from the user. I/O device 306 may include alphanumeric and function keys for communicating information and command selections to processor 304 from a user. In some embodiments, I/O device 306 comprises a plurality of individual devices directed to either or both input and output interactions between a user and computer system 102. For example, an output I/O device may include a display such as a cathode ray tube or a flat panel display while an input I/O device may include a keyboard and/or a cursor control such as a mouse, a trackball, a trackpad, or cursor direction keys for communicating direction information and command selections to processor 304 and for controlling cursor movement on an output I/O device.

Computer system 102 further comprises a communication interface 310 coupled to bus 302 for one-way and/or two-way network communication as described above with respect to communication interface 202. Communication interface 310 communicatively couples computer system 102 to NID 103 via a network link 312. NID 103, in turn, communicatively couples computer system 102 to the remainder of network 100.

Figure 4:
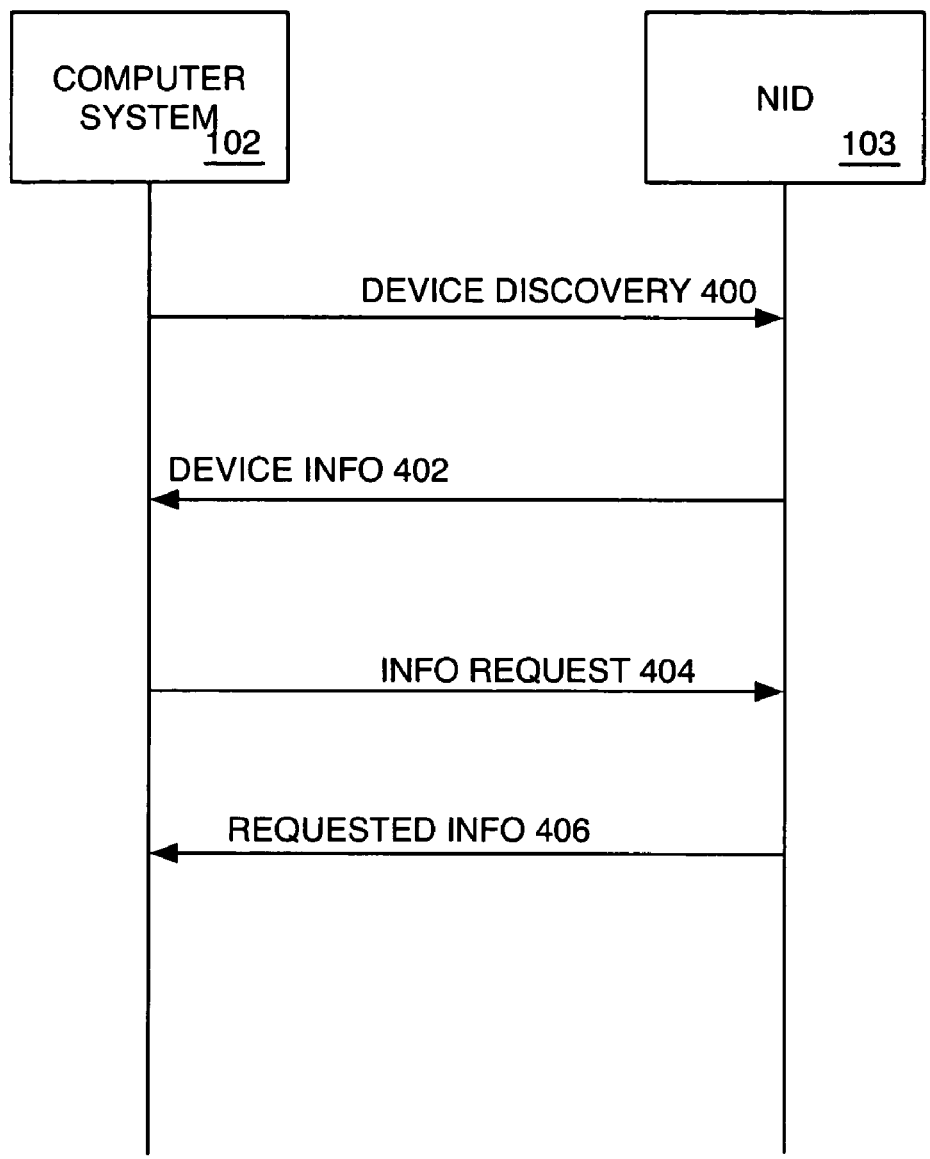
FIG. 4 is a message sequence diagram according to an embodiment.

FIG. 4 depicts a message sequence diagram of a portion of the exchange of messages between computer system 102, executing instructions comprising data retrieval tool 314, and NID 103. Computer system 102 transmits a device discovery message 400, e.g., an SNMP GET REQUEST protocol data unit (PDU), to NID 103 via network 100. Responsive to receipt of device discovery message 400, NID 103 transmits a device information message 402 to computer system 102. Device information message 402 comprises parameters specifying the NID 103 to the computer system, e.g., type of device, textual description of the device, etc.

After receipt of device information message 402, computer system 102 transmits an information request message 404, e.g., an SNMP GET REQUEST PDU, specifying a particular parameter to be requested from NID 103. For example, information request message 404 may specify a request for a particular value from the MIB of NID 103 by specifying an object identifier (OID) from a hierarchically-assigned namespace of the MIB. Example MIB objects include OIDs for an output queue length specified as ifOutQLen and for an address translation table specified as atTable.

In at least one embodiment, information request message 404 may comprise more than one particular parameter, i.e., computer system 102 may request multiple parameters at the same time from NID 103.

Responsive to receipt of information request message 404, NID 103 transmits the particular parameter requested to computer system 102 as a requested information message 406. Computer system 102 uses the received parameter information and/or stores the parameter information in memory 308.

In at least one embodiment, computer system 102 transmits information request message 404 on a predetermined periodic basis. That is, computer system 102 may request the particular parameter information on an on-going basis, as well as, responsive to occurrence or detection of other events either from NID 103 or from other devices connected to network 100. Additional information request messages 404 and requested information messages 406 may be exchanged between computer system 102 and NID 103.

An embodiment hierarchically specifies the data identifiers that are to be retrieved from a specific interface/media type by a software application, e.g., data retrieval tool 314 executed by computer system 102. The hierarchical specification may be applied to network interconnect devices 103, 104, and 105 managed by data retrieval tool 314. In at least one embodiment, the specifications may be broken out by specific device models or other criteria used for classifying devices. The embodiment is applicable to building an information request message 404, e.g., SNMP get requests, and without necessitating specification of how request contents are aggregated. In at least one embodiment, other network device management protocols may be used in place of SNMP.

According to an embodiment, groups of data identifiers are specified and each group is typically applicable to a certain type of port/interface/medium. The data identifiers represent data to be retrieved from that port/interface/medium by data retrieval tool 314. It should be noted, though, that the group contents themselves need not be restricted to only data identifiers that are specific to a port, the group contents may contain identifiers that are applicable at the device level rather than the port level. For example, an operating system registry is an example of one place that such a grouping may be specified. Data retrieval tool 314 is responsible for reading the name and contents of such groups. In at least some embodiments, the contents of a group may also comprise one or more groups (subgroups). The following example file snippet, which specifies three different groups of SNMP OID types for collecting performance metrics from network interconnect devices, provides an example:

```
PropertyGroupings {
    IfAndIfxMibCounts {
        Frames {
            ifOutPackets = 1.3.6.1.2.1.2.2.1.17
            ifinPackets = 1.3.6.1.2.1.2.2.1.11
            ifinNonUnicasts = 1.3.6.1.2.1.2.2.1.12
            ifOutNonUnicasts = 1.3.6.1.2.1.2.2.1.18
        }
        Bytes {
            ifOutBytes = 1.3.6.1.2.1.2.2.1.16
            ifinBytes = 1.3.6.1.2.1.2.2.1.10
            PerFrameOverheadBytes = 20
        }
    }
    MoreIfAndIfxMibCounts {
        Frames {
            ifOutPackets = 1.3.6.1.2.1.2.2.1.17
            ifinPackets = 1.3.6.1.2.1.2.2.1.11
            ifinNonUnicasts = 1.3.6.1.2.1.2.2.1.12
```

```
            ifOutNonUnicasts = 1.3.6.1.2.1.2.2.1.18
        }
        Bytes {
            ifOutBytes = 1.3.6.1.2.1.2.2.1.16
            ifinBytes = 1.3.6.1.2.1.2.2.1.10
            PerFrameOverheadBytes = 30
        }
    }
    PppBundleIfAndIfxMib {
        Frames {
            ifinPackets = 1.3.6.1.2.1.2.2.1.11
            ifOutPackets = 1.3.6.1.2.1.2.2.1.17
        }
        Bytes {
            ifinBytes = 1.3.6.1.2.1.2.2.1.10
            ifOutOctets = 1.3.6.1.2.1.2.2.1.16
        }
    }
}
```

The portion depicts the counter groups IfAndIfxMib-Counts, MoreIfAndIfxMibCounts, and PppBundleIfAndIfxMib which specify different groups of counters for different types of network interconnect device media (Ethernet, imaginary, and a PPP WAN link, specifically). For example, with respect to PppBundleIfAndIfxMib counter group, frame information received from a device supporting this type of MIB, i.e., a point-to-point protocol (PPP) interface, is available as specified according to the ifInPackets OID corresponding to the OID 1.3.6.1.2.1.2.2.1.11 specification. That is, in at least one embodiment, the particular OID specification provides a reference to a specification of the type of data available and the meaning of the data. For example, the specification may indicate that the data is a counter and the value is an integer representing the number of in-bound packets received. A lookup function may be performed using the particular OID specification in order to determine the content and format of the data to be received.

In at least one embodiment, similarities between the three counter groups are leveraged (note that the contents of IfAndIfxMibCounts are a superset of PppBundleIfAndIfxMib, and that MoreIfAndIfxMibCounts differs by only one property from IfAndIfxMibCounts) as follows:

```
PropertyGroupings {
    IfAndIfxMibCounts {
        parent = PppBundleIfAndIfxMib
        Frames {
            ifinNonUnicasts = 1.3.6.1.2.1.2.2.1.12
            ifOutNonUnicasts = 1.3.6.1.2.1.2.2.1.18
        }
        Bytes {
            PerFrameOverhead Bytes 20
        }
    }
    MoreIfAndIfxMibCounts {
        parent = IfAndIfxMibCounts
        Bytes {
            PerFrameOverhead Bytes 30
        }
    }
    PppBundleIfAndIfxMib {
        Frames {
            ifinPackets = 1.3.6.1.2.1.2.2.1.11
            ifOutPackets = 1.3.6.1.2.1.2.2.1.17
        }
        Bytes {
            ifinBytes = 1.3.6.1.2.1.2.2.1.10
            ifOutOctets = 1.3.6.1.2.1.2.2.1.16
        }
    }
}
```

In the second portion, note that the PppBundleIfAndIfxMib is specified as the parent of IfAndIfxMibCounts and thus, given the hierarchical nature of the structures, IfAndIfxMibCounts 'inherits" anything from PppBundleIfAndIfxMib not specifically overridden including the counter specifications that both have in common. MoreIfAnd IfxMibCounts consequently "inherit" any specifications from IfAndIfxMibCounts except for the single property that is specifically overridden.

The collection of interface type properties which are grouped in the above snippet is referred to as a property grouping. In at least one embodiment, the property grouping includes data identifiers comprising OIDs for a particular interface and/or medium type.

Figure 5:
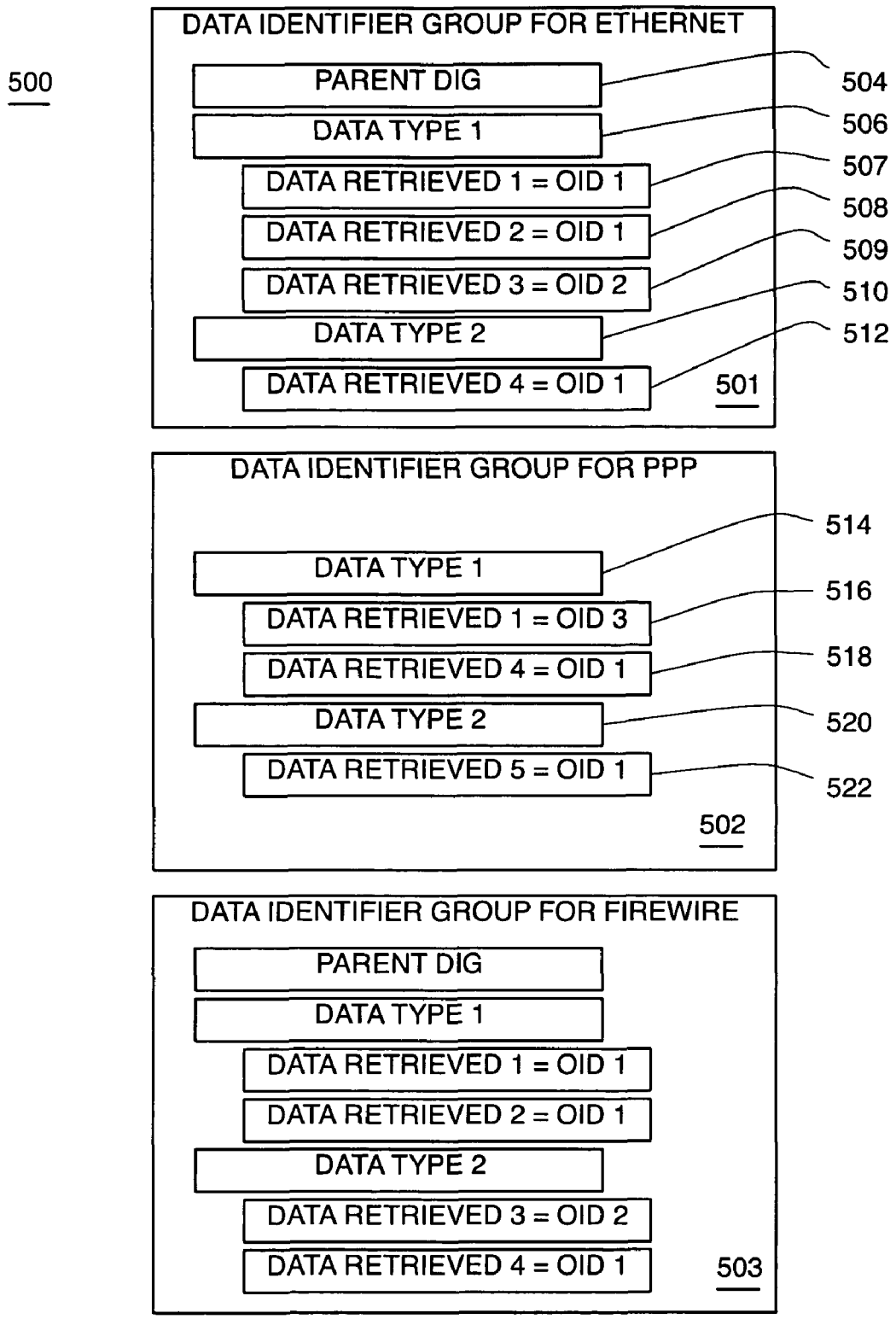
FIG. 5 is a high-level block diagram of data identifier groups according to an embodiment.

FIG. 5 depicts a high-level block diagram of data identifier groups (DIG) in a property grouping 500 for particular interface types of network devices. Property grouping 500 comprises three data identifier groups each corresponding to a different interface type: ETHERNET type 501, PPP type 502, and FIREWIRE type 503. The data identifier groups 501-503 comprise data fields corresponding to the above specifications.

ETHERNET type 501 comprises a parent DIG field 504, a first data type 506, and retrieved data specifications 508-509 for the first data type, a second data type 510, and retrieved data specification 512 for the second data type. PPP type 502 comprises a first data type 514, and retrieved data specifications 516, 518 for the first data type, a second data type 520 and a retrieved data specification 522 for the second data type.

Parent DIG field 504 is used to specify another DIG, e.g., PPP type 502 as a parent from which the DIG inherits specifications. In accordance with this example, DIG 501 specifies DIG 502 in parent DIG field 504 and thereby inherits the data identifier information specified in DIG 502, i.e., retrieved data specification 518 for first data type 514 and retrieved data specification 522 for second data type 520. Additionally, DIG 501 overwrites the specification for retrieved data specification 516 of DIG 502 with retrieved data specification 507 by specifying a different OID specification, i.e., "OID 1," in the retrieved data specification field.

Another portion of the embodiment associates a specific data identifier group with one or more network interconnect devices or medium types, or a combination thereof. The same hierarchical model is applied, again with an assumption that data retrieval tool 314 is responsible for reading the information associated with each categorization of device and/or interface type. One of the items contained within each section is the name of a data identifier group, but beyond that the contents of each device and/or interface type categorization are free-form in order to specify other properties, as well. An example file snippet specifies a default device specification and an overriding specification for a specific device type, as follows:

```
DeviceSpecifics {
    propertyGroup = IfAndIfxMibCounts
    pollingPriority = 2
    interfaceSpecificGroups {
        108 = PppBundleIfAndIfxMib
    }
    myRouterProduct {
        propertyGroup = MoreIfAndIfxMibCounts
```

```
        pollingPriority = 4
        interfaceSpecificGroups {
            108 = IfAndIfxMibCounters
        }
    }
}
```

The device specification portion depicts the data identifier group IfAndIfxMibCounts is applied to the interfaces of the devices by default except for interfaces of type 108 (e.g., a numeric identifier for PPP bundles per the Internet Engineering Task Force), where data identifier group PppBundleIfAndIfxMib applies. For devices of a type myRouterProduct, the data identifier group MoreIfAndIfxMibCounts is applied to the interfaces except those of type 108, where data identifier group IfAndIfxMibCounts applies. A property is also specified for the default case and for the myRouterType case for polling priority. Similar to the above-described property groupings, in this hierarchical file structure a subgroup inherits values from the parent group (implicitly indicated in the snippet based on nesting) unless otherwise overridden. The particular property is specified on a device-wide basis.

Figure 6:
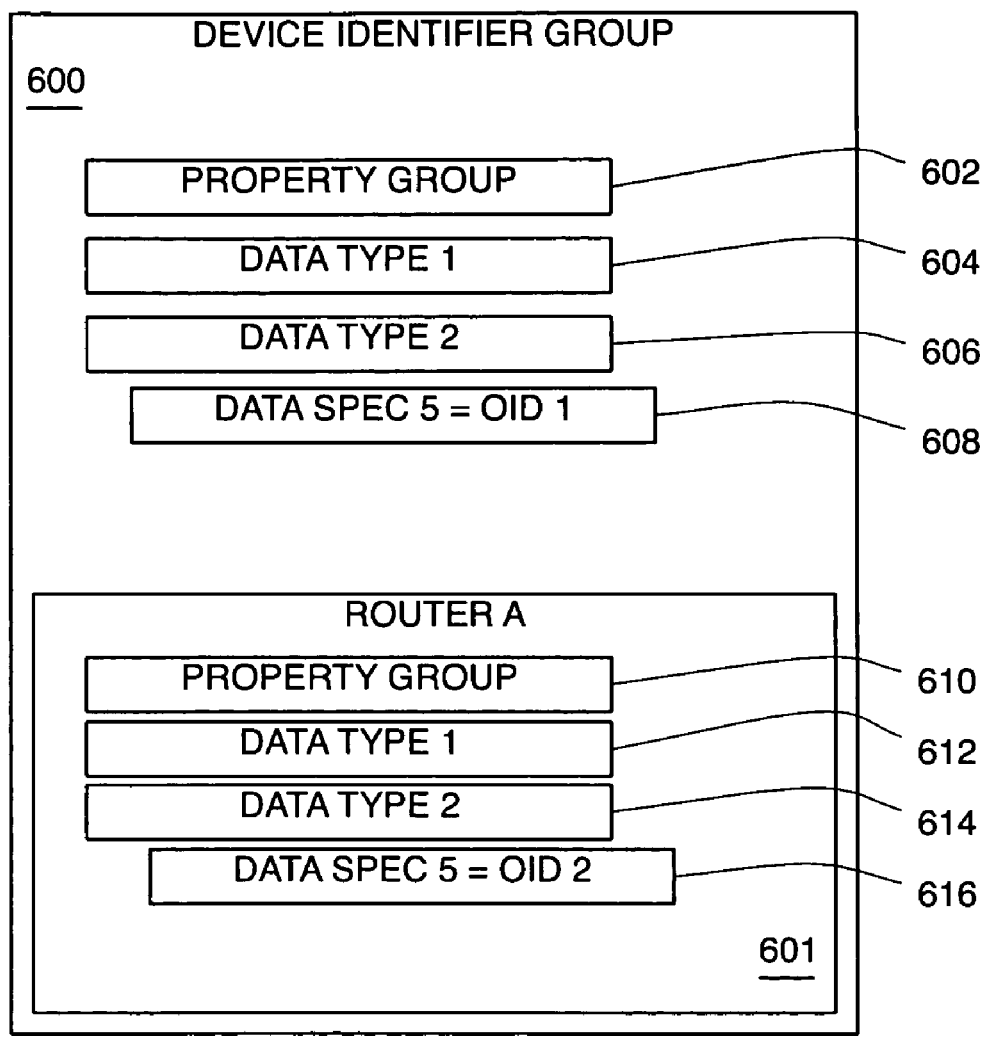
FIG. 6 is a high-level block diagram of a device identifier group.

FIG. 6 depicts a high-level block diagram of a device identifier group specification 600 similar to the above device specification portion. Device identifier group specification 600 comprises a default set of specifications and specifications for a particular device, e.g., router A 601. The default specifications, in at least one embodiment, comprise a property group specification 602, a first data type specification 604, a second data type specification 606, and a data specification 608 for the second data type specification. Property group specification 602 identifies a default DIG from property grouping 500 (FIG. 5) for use with respect to devices of the device identifier group 600. First data type specification 604 specifies, for example, a polling priority time. Second data type specification 606 specifies, for example, a particular interface type of the device which applies a different DIG data.

Router A 601 specification comprises a property group specification 610, a first data type specification 612, a second data type specification 614, and a data specification 616 for the second data type specification 616. Property group specification 610 is specified in router A 601 in order to override the default specification, i.e., property group specification 602. Similarly, first data type specification 612 and data specification 616 override the default specification, i.e., first data type specification 604 and data specification 608.

Figure 7:
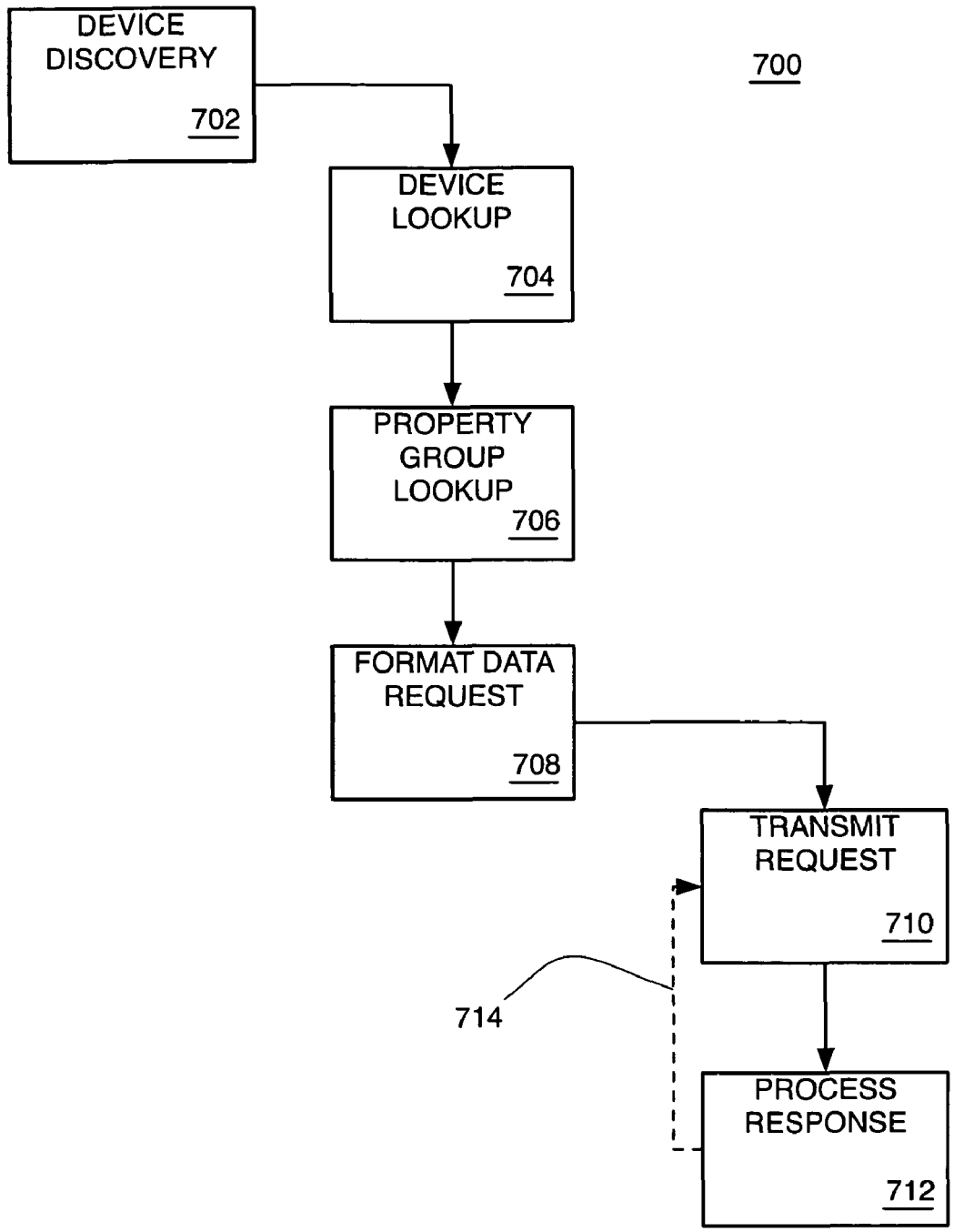
FIG. 7 is a process flow diagram according to an embodiment.

FIG. 7 depicts a high-level process flow diagram 700 according to an embodiment of data retrieval tool 314. The flow of control begins at a discovery function 702 wherein tool 314 transmits a device discovery message 400 to NID 103. Responsive to receipt of device information message 402, the flow of control proceeds to device lookup function 704 and tool 314 uses information from the received message to determine the device type of NID 103 in device identifier group 600. Based on a determined device type of NID 103, the flow of control proceeds to property lookup function 706 and tool 314 determines the DIG of the device type. Based on a determined DIG and device type of NID 103, the flow of control proceeds to format data request function 708 and tool 314 formats a data request for transmission to NID 103 in the form of an information request message 404 (FIG. 4). The data request is determined based on the DIG, data types, and retrieved data specifications for the DIG. In at least one embodiment, a parent DIG data type and retrieved data specification(s) of the parent DIG may be used and/or selectively overridden (replaced) for the DIG.

After the data request is formatted, the flow of control proceeds to transmit request function 710 wherein tool 314 causes computer system 102 to transmit the data request (as part of information request message 404) to NID 103. Responsive to receipt of a response (e.g., requested information message 406) from NID 103, the flow of control proceeds to process response function 712. Tool 314 processes the response to obtain and/or store the data received from NID 103. In at least some embodiments, tool 314 displays the data to a user via I/O device 306 and/or transmits the data to another computer system.

In at least one embodiment, tool 314 periodically transmits the data request to NID 103 as indicated by reference numeral 714 (dashed line).

Advantageously, the present embodiments allow software applications collecting data from disparate device types or from devices with disparate interface types to be written generically, so that differences between these disparate types can be isolated to the hierarchical file or registry structures described rather than being embedded within source code. This not only simplifies the software applications structure but provides extensibility, as new data identifier groups and specific types of device and/or interface information are added to the hierarchical structures without requiring modification of the software application.

The present embodiments may be used at least when a software application is attempting to formulate a common property from disparate data sources. This is illustrated within the hierarchical structures specified above for the Frames and Bytes sections of the groupings specification. The two subgroups within the larger data identifier groupings are used so the software application can compute a summary of the total bytes and total frames observed from each of the disparate types of devices and network interfaces called out in the subsequent snippet of configuration file that associated each device and/or interface with a specific data identifier grouping.

What is claimed is:

1. A computer system for requesting networked device information from a network interconnect device, comprising:
   a processor;
   a data store communicatively coupled with the processor and comprising:
      one or more data identifier groups hierarchically specifying data available from one or more networked devices; and
      a data retrieval tool comprising a set of instructions executable by the processor to obtain configuration data from the network interconnect device wherein the data retrieval tool is arranged to request the configuration data from the network interconnect device based on a data identifier group,
   wherein the data identifier group comprises a reference to a parent data identifier group from which the data identifier group inherits data type information, and a data specification which overrides a corresponding data specification in the parent data identifier group.

2. A computer system according to claim 1, wherein the data retrieval tool, executed by the processor, causes the processor to generate data requests based on the hierarchically specified data identifier group.

3. A computer system according to claim 1, wherein the data store comprises:

one or more device identifier groups hierarchically specifying device identifiers corresponding to one or more of the one or more networked devices.

4. A computer system according to claim 3, wherein the device identifier comprises a reference to a data identifier.

5. A computer system according to claim 4, wherein the device identifier comprises a reference to a parent device identifier from which the device identifier inherits device information.

6. A computer system according to claim 1, wherein the data specified in the data identifier group is specified using an object identifier.

7. A method of requesting networked device information from a network interconnect device, comprising:
   a computer system determining a device identifier from a device identifier group where the device identifier corresponds to device information received from the network interconnect device;
   determining a data identifier group from a property grouping where the data identifier group is based on information in the device identifier, wherein the data identifier group comprises a reference to a parent data identifier group from which the data identifier group inherits data type information, and a data specification which overrides a corresponding data specification in the parent data identifier group; and
   generating a configuration data request for the network interconnect device based on the data identifier group and the device identifier.

8. A method according to claim 7, comprising:
   transmitting the configuration data request to the network interconnect device.

9. A method according to claim 8, further comprising:
   storing configuration data received from the network interconnect device in response to the transmitted data request.

10. A method according to claim 7, wherein the property grouping is a hierarchical specification of data identifiers.

11. A method according to claim 7, wherein the device identifier group is a hierarchical specification of device identifiers.

12. A method according to claim 7, further comprising:
   transmitting a device discovery message to the network interconnect device.

13. A method according to claim 7, further comprising:
   transmitting the generated configuration data request one or more additional times to the network interconnect device.

14. A memory or a computer-readable storage device storing instructions which, when executed by a processor, cause the processor to determine a device identifier from a device identifier group where the device identifier corresponds to device information received from a network interconnect device;
   determine a data identifier group from a property grouping where the data identifier group is based on information in the device identifier, wherein the data identifier group comprises a reference to a parent data identifier group from which the data identifier group inherits data type information, and a data specification which overrides a corresponding data specification in the parent data identifier group; and
   generate a configuration data request for the network interconnect device based on the data identifier group and the device identifier.

* * * * *